Sept. 28, 1948.    W. B. BARNES    2,450,391
CLUTCH OPERATING MECHANISM
Filed Feb. 19, 1945    3 Sheets-Sheet 1

INVENTOR.
WILLIAM B. BARNES
BY W. P. Hahn
ATTORNEY

Sept. 28, 1948. W. B. BARNES 2,450,391
CLUTCH OPERATING MECHANISM
Filed Feb. 19, 1945 3 Sheets-Sheet 2
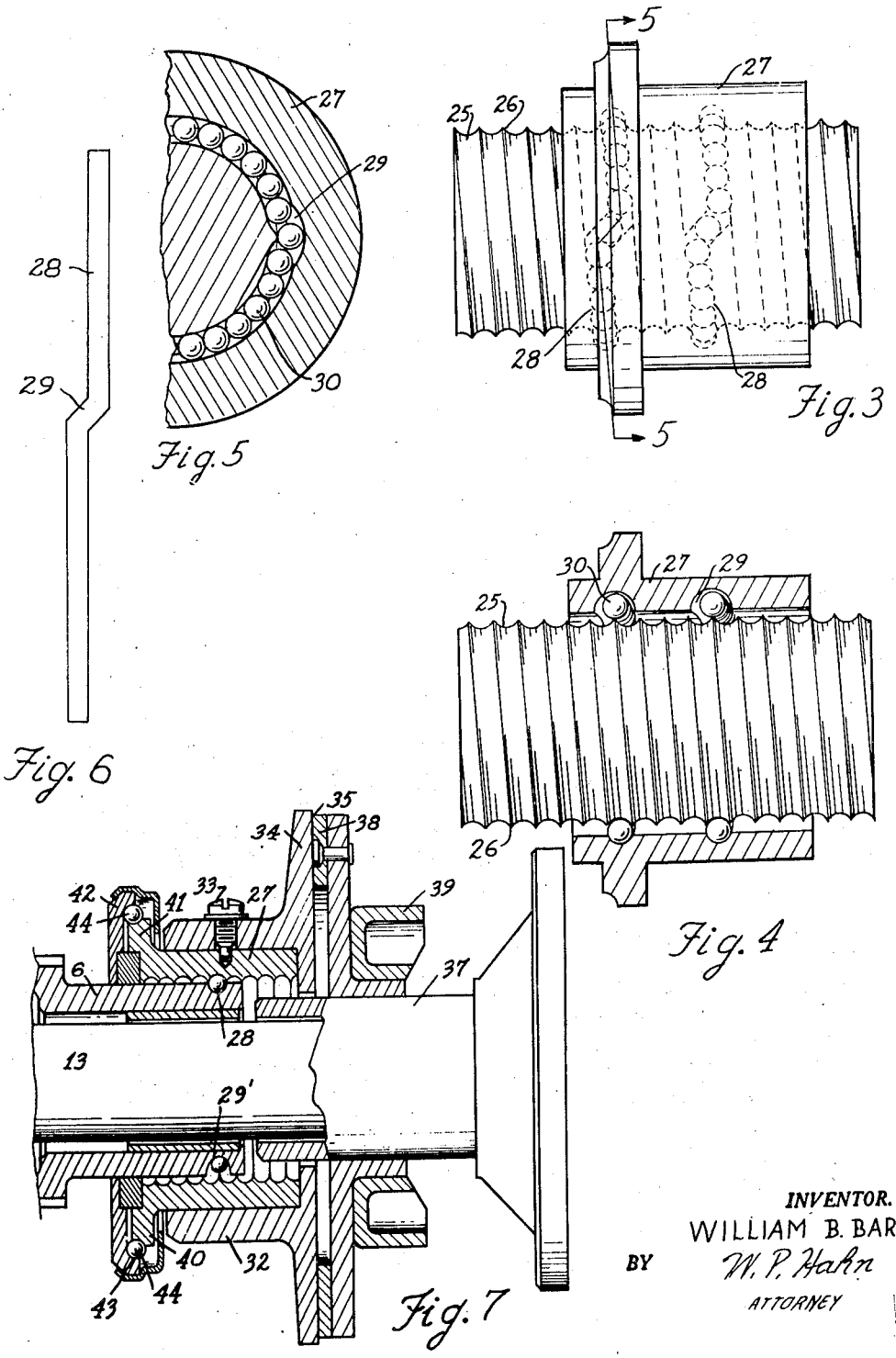
INVENTOR.
WILLIAM B. BARNES
BY W. P. Hahn
ATTORNEY Sept. 28, 1948.  W. B. BARNES  2,450,391
CLUTCH OPERATING MECHANISM
Filed Feb. 19, 1945   3 Sheets-Sheet 3
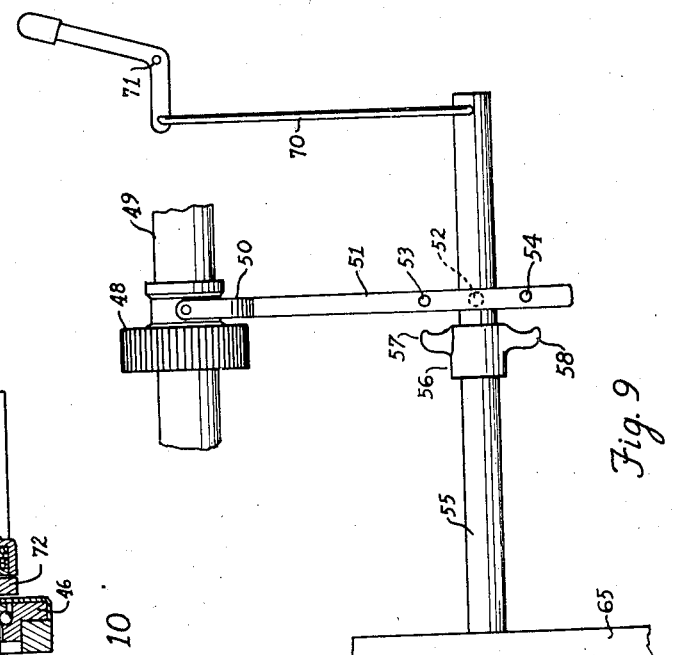
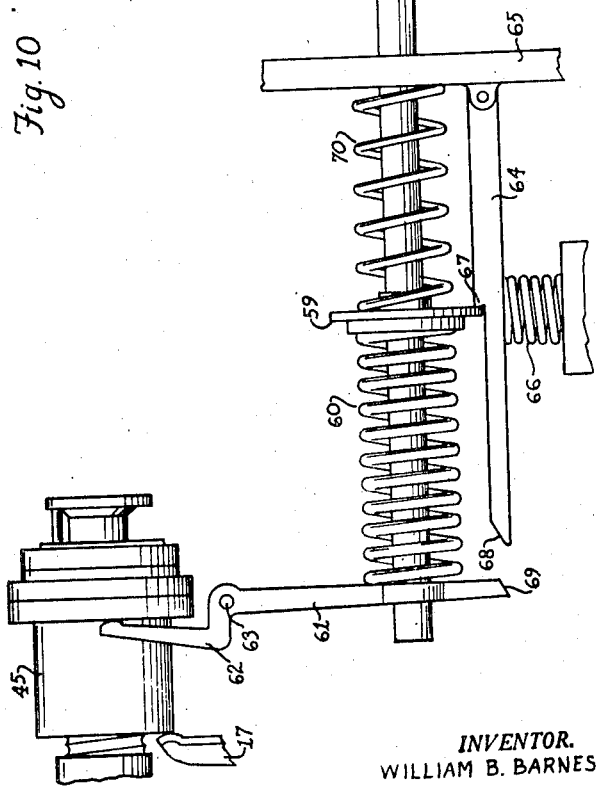
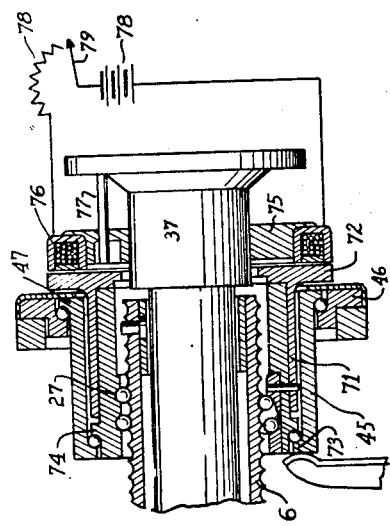
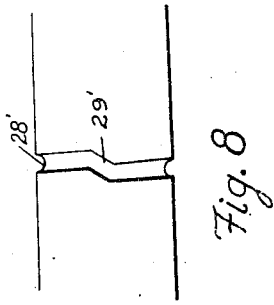
INVENTOR.
WILLIAM B. BARNES
BY W. P. Hahn
ATTORNEY Patented Sept. 28, 1948

2,450,391

UNITED STATES PATENT OFFICE 2,450,391

CLUTCH OPERATING MECHANISM

William B. Barnes, Muncie, Ind., assignor to Barnes Motor Developments Company, Muncie, Ind., a partnership consisting of William B. Barnes and Freda Arthur Barnes Application February 19, 1945, Serial No. 578,601

6 Claims. (Cl. 192—35)

The present invention relates to improvements in clutches, and particularly to improvements in automobile clutches and clutches of a similar type.

One of the objects of the invention is to provide a clutch having operating or controlling mechanism therefor which shall require a minimum of effort on the part of the operator to control the clutch.

Another object of the invention is to provide a clutch normally maintained in operating position by means of suitable springs and released by the compression of said springs, with the provision of means for the compression of said spring with a minimum of effort on the part of the operator.

A still further object of the invention is to provide a clutch with suitable operating mechanism therefor wherein the present type of linkage and leverage may be dispensed with and at the same time the clutch may be controlled by a minimum of effort on the part of the operator.

For the purpose of disclosing the invention, certain embodiments thereof have been illustrated in the accompanying drawings in which:

Fig. 3 is a side elevation of the clutch controlling screw and thread mechanism;

Fig. 4 is a similar view, the nut being shown in sections;

Fig. 5 is a sectional view on the line 5—5 of Fig. 3;

Fig. 6 is a developed view of one of the ball races of the screw and nut mechanism;

Fig. 7 is a sectional view of a modification of the invention;

Fig. 8 is a detailed view of the ball race of Fig. 7;

Fig. 9 is a view, more or less schematic, showing the control for a transmission, as well as the clutch; and Fig. 10 is a sectional view of a modification showing particularly an electromagnetic control for the clutch release mechanism.

Figures 1, 2:
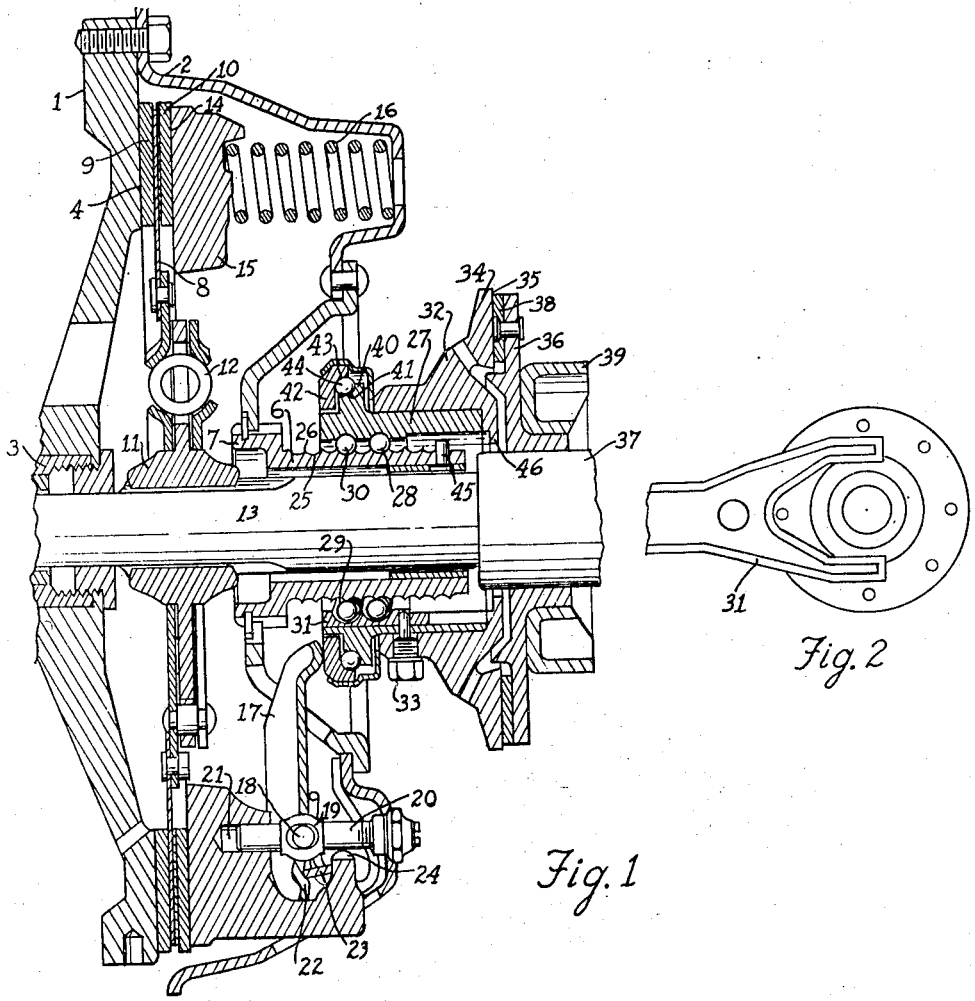
Fig. 1 is a longitudinal sectional view of a clutch embodying the present invention.
Fig. 2 is a detailed view of the clutch operating fork.

In the embodiment of the invention illustrated, a driving clutch member is provided, which member comprises a housing including two sections 1 and 2. The housing section 1 preferably is a disk-like form and is provided with a hub 3 adapted to be secured to and driven by the engine shaft. This section is also provided with a friction face 4.

The opposite housing section 2, which is adapted to be secured to the section 1 by suitable machine screws 5, is provided with a screw sleeve 6 provided with a flange 7 fitted within a central opening of the housing 2 and having teeth meshing with internal teeth of said openings, so that the sleeve 6 is driven by and rotates with the driving portion of the clutch and therefore rotates with the engine shaft.

The driven member of the clutch comprises a relatively thin disk 8, provided on its opposite faces with friction rings 9 and 10. This disk is connected to a hub 11 through the medium of suitable shock-absorbing springs 12 and the hub 11 is splined on the driven shaft 13. In automobile practice, this driven shaft is a part of the speed changing transmission of the automobile.

The friction rings 9 and 10 are clamped between the friction face 4 on the member 1 and a friction face 14 of a clamping ring 15 mounted within the housing member 2. This ring 15 is biased into clamping position through the medium of suitable heavy coiled springs 16 interposed between the back of the housing 2 and the clamping ring 15. Normally, therefore, the clutch is in engaged operating position. For releasing the clutch suitable levers 17, of which there may be three or more, are provided. These levers are provided with pivot pins 18 operating in bearings 19 on studs 20 bolted at one end to the housing 2 and having opposite ends operating in guide openings 21 in the ring 15. One end 22 of each lever 17 engages a bearing arm 23 bearing upon a finger 24 on the ring 15, so that as the inner end of the lever 17 is moved towards a driven member of the clutch, the clutch ring 15 will be retracted, compressing springs 16 and thus releasing the driven member.

The sleeve 6 on its outer periphery is provided with ball races 25 spirally developed or helically developed and forming spaces between what may be termed screw threads 26. This sleeve, as has heretofore been pointed out, constantly rotates with the engine shaft and therefore is a normally constantly rotating screw member.

Cooperating with this sleeve is a nut 27 which surrounds the sleeve and is provided with a pair of axially spaced ball races, each in the form of a helix 28. The ends of the helix are connected by a crossover, preferably in the form of a short helix 29, extending in the opposite direction from that of the helix 28 and this short crossover race 29 gradually increases in depth towards a point intermediate of its ends. Balls 30 operate in the two sets of raceways and due to the crossover 29, each ball as it reaches the end of its helical race 28, in the nut, crosses over into the beginning of the race by way of the crossover race 29. In effect, these balls operate as screw threads, engaging in the races in the screw and nut members so that as one member rotates relatively to the other, one of the members, in this instance the nut 27, will be advanced or retracted along the screw 6.

For assembly purposes, the crossover helix 29 is preferably formed in removable block 31 which is inserted in a suitable channel formed in the nut 27.

For effecting relative rotation between the nut 27 and the screw 6, a brake is provided, one member of which is provided with a sleeve 32 adapted to fit over the nut 27 and held thereon, against relative rotation, by suitable screw pins 33 and it will be noted that these pins extend through the nut 27 and into the block 31 for holding the block 31 against axial displacement. This sleeve 32 is provided with annular flange 34 having a friction face 35. The opposite member of the brake comprises a disk 36 axially movable upon, but rotatively stationary relatively thereto, a hub or bearing 37 of the driven shaft which bearing forms a part of the transmission casing. This brake member 36 is provided with a friction ring 38 adapted to make friction contact with the face 35 and the brake member 36 is axially moved through the medium of an operating fork 39 manipulated by any suitable operating means, such for instance as a clutch pedal of an automobile.

The front end of the nut 27 is provided with an annular flange 40 having a ball race 41 in the face thereof, and cooperating with this flange 40 is a pressure ring 42, likewise having a ball race 43. Within the race 41 and 43 are arranged suitable balls 44. This pressure ring is adapted to engage the inner ends of the levers 17 as the nut is advanced.

In operation, when it is desired to release the clutch, the operator advances the brake member 36 into engagement with the brake member 34, thereby holding the nut 27 against rotation or at least braking the nut sufficiently so that its speed of rotation will be less than the speed and rotation of the screw 6. Therefore, the nut will advance on the screw, moving the levers 17 into disengaging position and this advance will continue as long as the brake member 36 follows the movement of the nut and effects a braking action on the nut. It is obvious that the degree of release of the clutch may be nicely controlled, the operator simply by controlling the distance, the pedal is depressed. The advanced movement of the nut is limited by suitable pins 45 on the screw 6 which are adapted to be engaged by an internal flange 46 on the nut when the nut reaches the limit of its advanced position.

For releasing the clutch, all that is required is for the operator to release the clutch pedal, thereby bringing the brake member 36, back to its initial position. Under the pressure of the spring 16 the nut will be caused to spin in a reverse direction, riding back on the screw. Due to the fact that the balls 44 are interposed between the pressure ring 42 and the nut, practically no retarding friction occurs between the nut and levers 17, and as a result the nut will readily spin under the pressure of the springs 16. Actual operation of the parts of this character have shown that with eight pitch threads on the screw pressure on the nut will cause it to spin on the screw 6 and move in the reverse direction.

In Fig. 7 is illustrated a modification of the structure shown in Fig. 1, wherein the, what may be termed, threaded member is in the nut 27 and the helical race 28' is formed in the sleeve 6, this helical race 28' having a reversed crossover helix 29'. This arrangement provides, in some instances, for more adequate lubrication of the parts.

In Fig. 9, I have illustrated a further exemplification of the control mechanism of my invention. In the structure illustrated in this figure, the nut structure is provided with a sleeve 45, one end of which is adapted to bear on the clutch levers 17. This sleeve is provided with a ring 46 having a ball bearing engagement with a flange 47 on the sleeve.

In addition to controlling the clutch in the manner illustrated in Fig. 1, I provided means for effecting a shift of the transmission drive for an automobile. For the purpose of illustration, I have shown only one gear of the transmission, which gear 48 is splined upon and longitudinally shiftable on a driving shaft 49 of any of the well known forms of the transmission gearings now used in the automobile industry. By shifting the gear 48 from one direction to the other, it may be moved into or out of engagement with other driving gears for effecting a change speed drive. This gear is shifted on a shaft 49 through the medium of the suitable shifting fork 50 mounted at the end of a lever 51 pivoted at 52 and provided with a pair of shift pins 53 and 54. The lever 51 is rocked on its pivot 52 through the medium of a shift rod 55. This rod is provided with a fixed collar 56 having a pair of fingers 57 and 58 adapted to respectively engage the pins 53 and 54 on the lever 51, depending upon the position to which the rod 55 has been shifted transversely of its axis. Adjacent at its rear end, the rod is provided with a fixed collar 59, against which a coil spring 60, surrounding the rod, is adapted to abut. The rear end of this spring 60 abuts against the lower end of the shift lever 61 provided with a fork 62 adapted to be engaged by the collar 46 of the shifting nut. This lever is pivoted at the point 63. The rod is held against shifting to the right, (looking at Fig. 9) until the spring 60 has been placed under suitable compression by a latch 64, pivoted to a stationary portion 65 of the automobile frame and biased in latching position by a coil spring 66. This latch is provided with a shoulder 67 normally engaging the collar 59. The rear end of the latch is provided with a cammed surface 68 adapted to be engaged by a cammed surface 69 on the lever 61.

For shifting the rod 55 in a direction to cause either the fingers 57 to engage the pin 53 or the fingers 58 to engage the pin 54, the front end of the rod is connected by a suitable cable or link 70 with a bell crank or other operating arm 71.

In operation, if it is desired to shift the gear 48 to the right, say for establishing a low speed drive of the transmission, the bell crank lever is moved to raise the end of the rod 55, so that the fingers 57 will engage the pin 53, but the fingers 58 will clear the pin 54. When the nut mechanism is operated to move the sleeve 45 to the left, this will rock the lever 61 on its pivot, compressing the spring 60 until the cam 69 engages the cam 68, releasing the latch and under the influence of the bias of the spring 60, the shift lever 51 will be moved to shift the gear 48 to the right, (looking at Fig 9).

This action is so timed that the sleeve 45 has had an opportunity to operate the clutch levers 17 to disengage the clutch, connecting the driven shaft 49, corresponding to shaft 13 of Fig. 1, from the engine drive.

Of course, as soon as the shift has been effected, the screw and nut operating mechanism may be deenergized to permit the parts to return to normal position, and in the structure in Fig. 9, the shift rod 55 is returned to its normal position under the influence of the coil spring 70, which, however, is not as strong a spring as the spring 66.

In Fig. 10, I have shown a modification of the structure illustrated in Figs. 3 and 4, to accomplish the shifting of the mechanism illustrated in Fig. 9. In this structure, illustrated in Fig. 10, the screw 6 is the same as that illustrated in Fig. 1 and driven in the same manner. The nut 27 is provided with a flanged sleeve 71, surrounding the nut and provided with a flange 72 which may be of soft iron or other suitable magnetic material. This sleeve 71 is pinned to the nut 27, so that the two parts are, in effect, a single unitary structure. Surrounding the nut is the sleeve 65, heretofore described, having its flange 47 making ball bearing engagement with the thrust collar 46. The opposite end of this sleeve is provided with an inturned flange 73 having a ball bearing engagement with a rib 74 on the nut 27, so that the thrust between the nut 27 and the sleeve 65 is taken by the ball bearings to therefore reduce the friction between these parts to the minimum.

The brake for holding the nut 27 against rotation movement in the structure illustrated in Fig. 10, comprises an electromagnetic brake in the form of a collar 75 carrying a magnetic coil 76 adapted to cooperate with the flange 72, which flange comprises the armature for the electromagnet. This collar 75 is axially movable on the hub or bearing member 37 of the frame, being held against rotation thereon by suitable pins 77. Therefore, when the magnet 76 is energized, the magnetic flux of the electromagnetic clutch will tend to lock the armature 72 and the magnet, together holding the sleeve 71 and with it the nut 27 against rotation, causing the nut to feed forward, to the left in Figs. 9 and 10.

The extent to which the magnet 76 may be energized may be controlled by a suitable resistance 78 adapted to be inserted or removed from the circuit of the magnet 76, which circuit includes the battery 79 or other suitable source of electrical supply, and the resistance control arm 70 which may be connected to or form a part of the ordinary clutch operating pedal of an automobile.

I claim:

1. A clutch operating means for friction clutches which clutches include means for biasing the clutch members into an engaged position and means for moving said members into disengaged position, said operating means comprising a normally rotating screw member, a nut member normally free to rotate with said rotating screw member and axially movable on said screw member when relative rotation is effected between said members, brake means for holding said nut member against rotating at the same speed as the screw member to cause said nut member to advance and move said clutch members into disengaged position and axially movable with said nut member, one of said nut and screw members having a helical channel in the periphery thereof and having a peripheral race-way connecting the ends of the helix and the other of said nut and screw members having a multiplicity of screw channels therein, said friction reducing balls mounted in said channels whereby said nut member may rotate on said screw member under the bias of said clutch biasing means when said brake means is released.

2. A clutch operating means for friction clutches which include means for biasing the clutch members of the clutch into engaged position, said operating means comprising a member rotatable with the driving member of the clutch and having a spiral ball race, a nut operating on said rotatable member having a helical ball race in its inner face, said helix having its ends connected by a crossover in the inner face of the nut of greater depth than the helical race, balls operating in said races and constituting screw threads for feeding said nut axially of said rotating member, a brake axially movable with said nut for establishing relative rotation between said rotatable member and said nut to advance said nut on said rotatable member in a direction to disengage said clutch members, said biasing means for the clutch members exerting a pressure on said nut member to cause it to rotate on said rotating member and feed along said member in the reverse direction when said brake is released.

3. A clutch operating means for friction clutches which include means for biasing the clutch members of the clutch into engaged position and lever means for moving said clutch members into disengaged position and against said biasing means, said operating means comprising a member rotatable with the driving member of the clutch and having a spiral ball race, a nut operating on said rotatable member having a helical ball race in its inner face, said helix having its ends connected by a crossover race in its inner face of greater depth than the helical race, balls operating in said races and constituting screw threads for feeding said nut axially of said rotatable member, a brake axially movable with said nut for establishing relative rotation between said rotatable member and nut to advance said nut on said rotatable member in a direction to engage said lever means and disengage said clutch members, said biasing means exerting a pressure on said levers to cause said nut to rotate on the said rotating member and feed along said rotating member in a disengaging direction when said brake is released, and friction reducing means between said nut and said operating levers.

4. A clutch operating means for friction clutches which include means for biasing the clutch members into engaged position and operating levers for moving said clutch members into disengaged position against said biasing means, said operating means comprising a screw member and a nut member providing a screw and nut assembly, one of the members of said assembly being rotatable with the driving member of the clutch and being provided with a spiral ball race, the other member of said assembly being provided with a helical ball race having its ends connected by a peripheral crossover race of greater depth than the helical race balls operating in said races and constituting screw threads, braking means axially movable with the non-driven member of said assembly for holding said non-driven member of said assembly against relative rotation, with respect to the driven member of the assembly, to cause the non-driven member of the assembly to advance axially of the driven member in a direction to move the clutch members into disengaged position, said members under the influence of said biasing means exerting a pressure on the non-driven member of the assembly to cause the same to rotate on the driven member into a disengaged direction when the brake is released.

5. A clutch operating means for friction clutches which include a driving clutch member mounted on a driving shaft and a driven clutch member, means for biasing the same into engaged position and levers for moving the same into disengaged position, said operating means comprising a sleeve drivingly connected to the driving shaft and having peripheral spiral ball races, a nut axially movable upon and surrounding said sleeve having an internal ball race in the form of a helix and a second internal race deeper than and connecting the ends of said helix, balls operating in said races, thrust flange on said nut and a thrust ring on said flange engageable with said operating levers, balls interposed between said ring and flange, a brake member carried by said nut and an operator controlled brake member axially movable with said nut and cooperating with said first mentioned brake member and controlling the rotative movement of said nut.

6. A clutch operating means for friction clutches, which includes means for biasing the clutch members into engaged position, and means for moving said members into disengaged position, said operating means comprising a normally rotating screw member, a nut member normally free to rotate with said rotating screw member and axially movable thereon when said nut and screw members are rotated relatively to one another and electromagnetic brake means axially movable with said nut member for holding said nut member against rotating at the same speed as the screw member to cause said nut member to advance and move said clutch members into disengaged position, one of said nut and screw members having a helical channel therein having a channel raceway connecting the ends of the helix and the other of said nut and screw members having a multiplicity of channels therein and friction reducing balls mounted in said channels.

WILLIAM B. BARNES.

REFERENCES CITED

The following references are of record in the file of this patent:

UNITED STATES PATENTS

| Number | Name | Date |
|---|---|---|
| 888,619 | Kelly | May 26, 1908 |
| 1,864,613 | Phillips | June 28, 1932 |
| 2,008,967 | Rossmann | July 23, 1935 |
| 2,072,832 | Weydell | Mar. 2, 1937 |
| 2,085,607 | Rockwell | June 29, 1937 |
| 2,277,244 | Marcum | Mar. 24, 1942 |
| 2,293,758 | Pateras Pescara | Aug. 25, 1942 |
| 2,321,255 | Schultz et al. | June 8, 1943 |